United States Patent [19]

Kinsella

[11] 4,269,244
[45] May 26, 1981

[54] ROTARY CHIPPING HEAD

[75] Inventor: Phillip W. Kinsella, LaCenter, Wash.

[73] Assignee: Schurman Machine Works, Inc., Woodland, Wash.

[21] Appl. No.: 923,929

[22] Filed: Jul. 13, 1978

[51] Int. Cl.³ ............................................. B27G 13/10
[52] U.S. Cl. ...................................... 144/218; 144/39; 144/231; 144/235; 407/113
[58] Field of Search ................... 407/113, 114; 144/39, 144/41, 114 R, 118, 162 R, 176, 218, 229, 220, 224, 223, 231, 228, 235, 240, 241, 323, 326 R, 326 A, 326 B, 326 C

[56] References Cited

U.S. PATENT DOCUMENTS

| 7,827 | 10/1850 | Southworth . | |
|---|---|---|---|
| 14,299 | 2/1856 | Livermore . | |
| 22,430 | 12/1858 | Humphrey | 144/223 |
| 591,838 | 10/1897 | Green, Jr. | 144/118 |
| 692,583 | 2/1902 | Zimmermann . | |
| 815,161 | 3/1906 | Hall | 144/235 |
| 1,183,015 | 5/1916 | Lane | 144/118 |
| 1,249,332 | 12/1917 | Cline | 144/118 |
| 1,903,002 | 3/1933 | Johnson . | |
| 2,659,398 | 11/1953 | Marvin | 144/118 |
| 2,923,332 | 2/1960 | Osmon | 144/176 |
| 2,964,079 | 12/1960 | Johnson . | |
| 3,447,578 | 6/1969 | Mitten | 144/218 |
| 3,521,684 | 7/1970 | McRobert et al. . | |
| 3,629,919 | 12/1971 | Trevarrow, Jr. | 407/113 |
| 3,780,778 | 12/1973 | Chapman . | |
| 3,781,956 | 1/1974 | Jones et al. | 407/113 |
| 3,842,873 | 10/1974 | Valo | 144/176 |
| 3,990,337 | 11/1976 | Barbour, Jr. . | |

FOREIGN PATENT DOCUMENTS 245450  7/1947  Switzerland ............................. 144/229

*Primary Examiner*—W. Donald Bray
*Attorney, Agent, or Firm*—Klarquist, Spurkman, Campbell, Leigh, Whinston & Dellett

[57] ABSTRACT

A plate-like rotary chipping head has removable chipping knives mounted on its circumferential periphery for chiseling a flat face on a log or other wooden workpiece as the head rotates with a flat workpiece-confronting face thereof in a plane parallel to the direction of relative linear movement between the head and workpiece. Replaceable planing bit inserts are carried on such face for smoothing the flattened surface of the workpiece formed by the chipping knives. The chipping and planing functions are carried out simultaneously as the head rotates into the workpiece. Chips and planer shavings of a quality suitable for use as pulp chips are produced.

9 Claims, 6 Drawing Figures

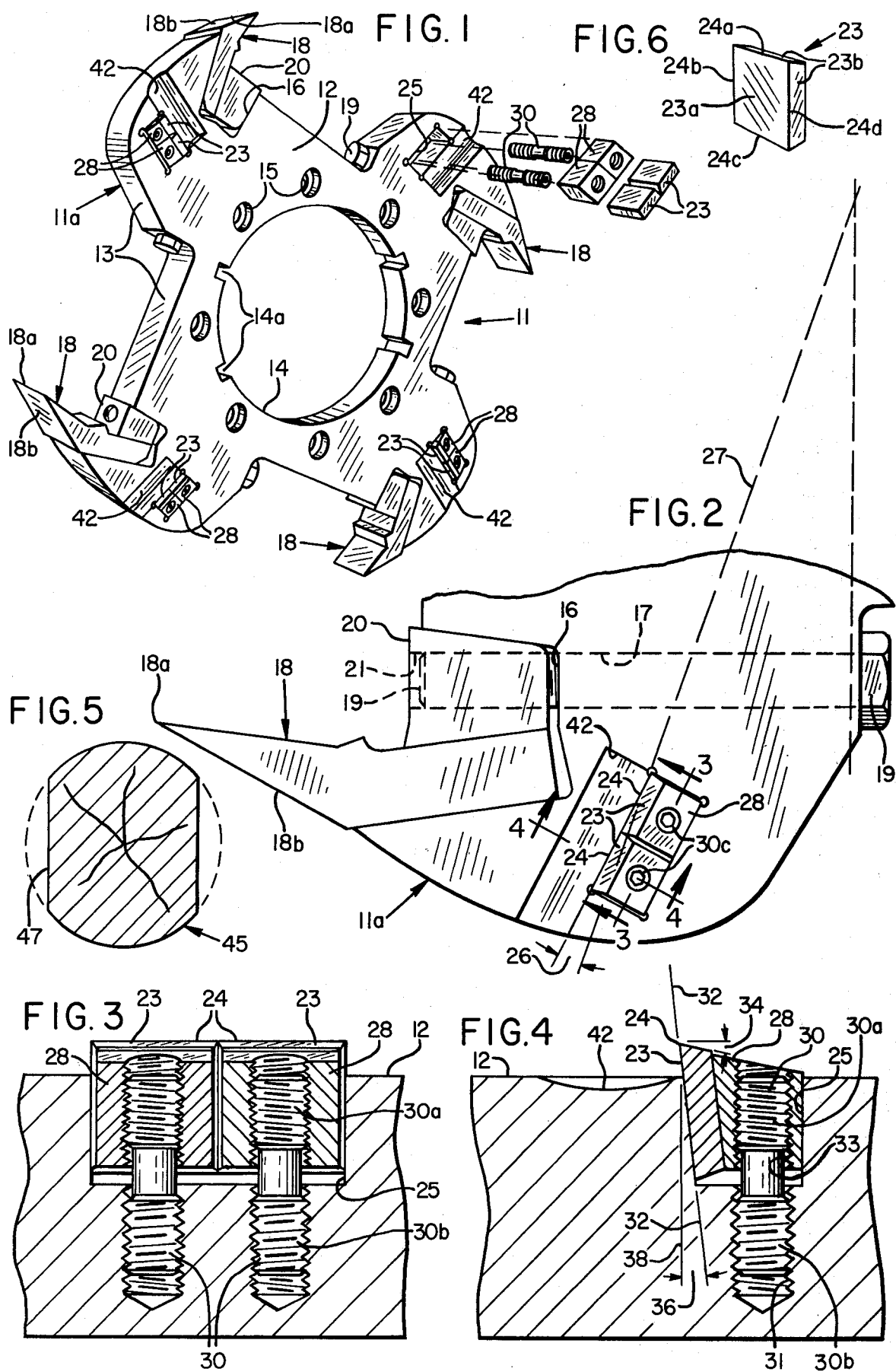

ROTARY CHIPPING HEAD

BACKGROUND OF THE INVENTION

1. Field of the Invention

The present invention relates to a wood chipping machine for chipping a flat face on a log, cant or other piece of wood and simultaneously smoothing the flat face thus formed while producing usable wood chips and shavings in the process.

2. Description of the Prior Art

Formerly, logs were flattened along one or more sides by sawing slabs from them as they moved relative to the saw. Once flattened, the resulting cants, or boards sawn from the cants, would be planned on all four sides to yield finished dimension lumber. If unfinished or "rough sawn" lumber were desired, the planing operation could be eliminated.

The resulting slabs had to be conveyed to a separate location and either burned as waste, ground into hog fuel for the mill's boilers, or reduced to marketable pulp chips in a separate chipping operation.

Subsequently, it became feasible to combine a rotary chipping head with a saw blade so that the slab was chipped as the log was flattened on one face, as shown by U.S. Pat. No. 3,780,778. One drawback to this approach, however, was that it introduced sawdust into the chips, reducing their quality and acceptability as pulp feed stock.

Another drawback to the combination saw and rotary chipper involved maintenance. The saw blades dulled rapidly, necessitating their replacement and resharpening. Because of the peculiar design of such devices, this was a tedious process and involved additional labor costs to resharpen the blades and to remove and replace them on the machine. It also required much down time for the machine, resulting in loss of productivity.

The development of improved rotary chipping heads enabled deletion of the saw blade. However, such chipping heads formed a flat face on the workpiece that was still too rough to enable use of the resulting boards or timbers even as rough-sawn lumber without a subsequent planing operation.

Accordingly, there is a need for an improved rotary chipping head capable of flattening a face of a log or other wood member while leaving such face acceptably smooth, without the use of rapidly dulling saws and without the need for a subsequent planing operation, and while producing usable pulp chips.

SUMMARY OF THE INVENTION

The present invention is a rotary chipping head for chipping edger machine which chips a flat face on a log or other workpiece in a chisel-cutting action and simultaneously smooths the flat face with a planing action, forming acceptable pulp chips in the process. The head of the invention features long-wearing chipper knives and throw-away planing bits with multiple planing edges which can be quickly rotated successively into working position. When all planing edges of the bits have been dulled, the bits can be quickly removed from the head and replaced, with minimum down time for the edger.

Whenever it is necessary to renew dulled edges on the planing bits, the chipping edger is stopped briefly. The planing bits are easily removed from the head by loosening screws and wedges which hold them in their sockets in the side of the head. When one edge of a bit is dulled, the bit is simply rotated in its socket to present a new planing edge to the working face of the machine.

The head also features a shallow groove in its working face, just ahead of each set of planing bits. The groove extends radially to the periphery of the head to receive shavings produced by the bits and guide them away from the head.

A primary object of the invention is to provide a rotary chipping head whereby logs and other wooden members are flattened and the flattened face smoothed in one step.

Another object is to produce in the flattening and smoothing operation commercially acceptable pulp chips.

Another object is to enable low cost maintenance of the chipping head with a minimum of machine down time. More specifically, it is desired to have easily changeable planing blades. It is also a specific objective to utilize a multi-edged design of planing blade which is inexpensive and sufficiently long-lasting to be discardable so as to avoid the labor cost of resharpening such blades.

Another specific object is to provide a mounting means for the planing blades which facilitates the rapid change of their working edges and their rapid replacement.

The foregoing objects, features and advantages of the present invention will become more apparent from the following detailed description which proceeds with reference to the accompanying drawing.

BRIEF DESCRIPTION OF THE DRAWING

In the drawing:

FIG. 1 is a perspective view of a rotary chipping head, in accordance with the invention dismounted from its rotating shaft;

FIG. 2 is a plan view of the workpiece-confronting face of a single chipping arm of the chipping head of FIG. 1;

FIG. 3 is a sectional view taken along the line 3—3 of FIG. 2;

FIG. 4 is a sectional view taken along the line 4—4 of FIG. 2;

FIG. 5 is a view of a workpiece (log) in cross-section after it has been chipped and planed, the dashed lines outlining the material that has been removed; and FIG. 6 is a perspective view of one of the planing bits of FIG. 1.

DETAILED DESCRIPTION OF PREFERRED EMBODIMENT

In the drawing, FIG. 1 shows a rotary chipping head 11 removed from the rotating shaft (not shown) of a chipping edger on which it would normally be mounted. Head 11 is a generally plate- or disc-like member with flat opposed faces, including a working, or work-confronting, face 12 bounded at its outer circumference by peripheral edge surfaces 13 and at its inner limits by a center opening 14 with keyways 14a for mountng the head on its shaft. Bolt holes 15 surround center opening 14 for bolting together a series of the chipping heads 11 on a common shaft to form a chipper head assembly whose thickness corresponds to the maximum thickness of material or wane to be chipped from workpieces being processed.

The outer periphery of the head 11 includes four projecting equally circumferentially spaced knife mounting arm portions 11a. Each arm portion 11a defines a socket 16 along its leading edge surface, as determined by the direction of head rotation, for receiving a chipping knife 18 and an associated knife mounting wedge 20.

Knife 18 has a chisel-type cutting edge 18a extending generally parallel to the axis of rotation of the head. Cutting edges 18a represent the radially outermost points on the head assembly, as will be apparent from FIG. 2. Knife 18 includes a flat outer surface 18b which slopes radially inwardly and rearwardly from cutting edge 18a to provide the cutting edge with relief rearwardly thereof.

Wedge 20 secures knife 18 within socket 16 when a bolt 19 is tightened. Bolt 19 extends from back to front through an edgewise opening 17, through mounting arm portion 11a and into a threaded hole 21 of the wedge.

Two planing bits 23 are installed in a recess or socket 25 in the workpiece-confronting face 12 of each mounting portion arm 11a. Referring especially to FIGS. 2 and 3, planing bits 23 are arranged side by side so as to form a single, straight, generally radially extending continuous, planing edge 24. As many bits as are necessary to achieve adequate planing overlap on the face of the workpiece are used. Such groups of bits are preferably positioned slightly radially inwardly of the outer circumference of each arm portion 11a at a small distance behind an associated chipping knife 18. This position enables a previously flattened semi-circular arc of the workpiece face to be planed by such bits during each chipping arm stroke.

The planing bits are oriented on the head so that the line of their working planing edges 24 form a small positive or "hook" angle 26 with a radius 27 of the head drawn through such planing edges. This angle 26 will vary depending on the shape and positioning of the planing bits used. In the preferred embodiment, such angle is 8°, but in any case such angle should be positive rather than neutral or negative for a smooth planing action.

Each planing bit 23 is of generally square shape, having two opposing parallel square faces, one such face, the front face 23a, being slightly larger than the other, rear face, and being defined by the planing edges 24a–d of the bit. The remaining four narrower edge surfaces 23b are trapezoidal, each having as its larger side a planing edge of the bit. Thus, each bit has four interchangeable planing edges 24a–d, one of which is operative at a time. The planing bits are intended to be replaced and discarded when worn out on all four planing edges, thus avoiding any need for sharpening.

Referring to FIG. 4, wedges 28 secured by threaded studs 30 hold planing bits 23 in socket 25 of the workpiece confronting face 12. Studs 30 are threaded into a threaded hole 31 in the bottom of socket 25 and into a threaded hole 33 through each wedge. The planing bits are inserted in socket 25 between wedges 28 and the forward wall of the socket nearest the associated chipping knife. The planing bits are positioned in their sockets such that their front faces 23a extend in a plane 32 nearly normal to the workpiece confronting face. To facilitate use of wedges 28 as mounting means as well as to provide a desired relief angle 34 for the planing edges, socket 25 is designed to mount the planing bits with a forward lean in the direction of rotation of the chipping head. The forward lean angle 36 is defined as the angle between the face of each bit and a plane 38 normal to the working face of the head. Such angle in the preferred embodiment is a positive 7°, but the angle selected in any case will depend on the shape of bits used. To facilitate quick and easy replacement or rotation of bits 23 in their sockets, studs 30 are threaded oppositely at opposite ends at 30a, 30b, and their outer ends have a socket-type driving recess 30c. Thus, when the stud is rotated in a direction to drive the stud into the threaded hole 31 in working face 12, the opposite threaded outer end of the stud tends to pull the wedge 28 into the socket 25, thereby securing planing bit 23.

FIGS. 1, 2 and 4 show shallow channels 42 in the workpiece-confronting face 12 immediately ahead of and paralleling the front wall of socket 25 to collect and conduct planer shavings to the outer periphery of the chipping head. Such channels also parallel the planing edges of the planing bits and extend from socket 25 to the outer periphery of the head.

OPERATION

In operation, the chipper head assembly of the machine is rotated about the axis of its shaft. A log, cant or other wooden workpiece to be flattened is fed toward the chipper head assembly along a path parallel to the workpiece-confronting face of the rotating chipper head assembly. As the workpiece feeds past the rotating head assembly, chipping knives on each head of the assembly progressively remove material from the workpiece 45, leaving a flattened side 47 on the workpiece at the workpiece-confronting face of the inner endmost head, as shown in FIG. 5. Such chipping process also produces wood chips which are suitable for use as feedstock in the production of paper pulp.

Simultaneously with the above chipping action, the planing blades or bits 23 on the workpiece-confronting face of the endmost head next adjacent to the flattened face of the workpiece planes a thin shaving of additional material from the previously flattened face, leaving a smoothly flattened workpiece face. Such planing action removes planer shavings from the face of the workpiece which become mixed in with the wood chips produced by the chipping knives. The mixture, largely dominated by wood chips, is of acceptable quality for use as pulp chips. As the head assembly rotates, the generally radial chip channels on the workpiece-confronting face 12 guide the planer shavings away from the head under the influence of centrifugal force.

When maintenance is required on the chipping head assembly or any of its parts, the chipping edger is stopped. Removal of both the chipping knives and the planing bits is accomplished by loosening the threaded fasteners of their respective wedges slightly. If the planing edges of the bits which have been operating at the workpiece-confronting face of the inner endmost head have become dulled, the planing bits may be rotated 90° to present a sharp, unused edge. Upon reinserting the planing bit with a new edge at the workpiece-confronting face, its wedge is re-tightened. A replacement planing bit may be installed in the same manner, with the old one being discarded.

From the foregoing description it will be apparent that only the endmost head or heads next adjacent to the face of a workpiece to be flattened need be provided with the planing bits as described. More specifically, only the working face of such endmost heads are provided with planing bits.

Having illustrated and described the principles of my invention by what is presently a preferred embodiment thereof, it should be apparent to those skilled in the art that such embodiment may be modified in arrangement and detail without departing from such principles. I claim as my invention all such modifications within the true spirit and scope of the following claims.

I claim:

1. A rotary chipping head for a chipping edger machine for forming a smooth flat face on a wooden workpiece, the chipping head comprising:

a rotary head member having means for mounting said member for rotation about an axis, opposite end faces in planes normal to said axis including a flat workpiece-confronting face extending normal to said axis and a radially outer periphery defining the outer limits of said faces;

chipping means at said outer periphery and next adjacent to said workpiece-confronting face including a small number of chipping knives, each knife having a straight chisel-type chipping edge normal to said face at the radially outer limits of said outer periphery for progressively chipping a thickness of material from a wooden workpiece in a chisel-cutting action in the form of pulp chips as said workpiece moves linearly and non-rotationally relative to said workpiece-confronting face and in the plane of said face, thereby leaving a flattened face on the workpiece;

and planing means on said workpiece-confronting face radially inwardly of said chipping edge for smoothing in a planing action said flattened face formed by said chipping means as said head member rotates progressively removing material from the workpiece;

said planing means including one planing means for each chipping knife, each of said planing means having a planing edge substantially parallel to said workpiece-confronting face.

2. A rotary chipping head according to claim 1 in which said planing means is positioned only on said workpiece confronting face.

3. A rotary chipping head for a chipping edger machine for forming a smooth flat face on a wooden workpiece, the chipping head comprising:

a rotary head member having means for mounting said member for rotation about an axis, opposite end faces in planes normal to said axis, including a flat workpiece-confronting face extending normal to said axis and a radially outer periphery defining the outer limits of said faces;

chipping means at said outer periphery and next adjacent to said workpiece-confronting face having a straight chipping edge normal to said face at the radially outer limits of said outer periphery for progressively removing material from a wooden workpiece in a chisel-cutting action as said workpiece moves linearly and non-rotationally relative to said workpiece-confronting face and in the plane of said face, thereby leaving a flattened face on the workpiece;

and planing means on said workpiece-confronting face radially inwardly of said chipping edge for smoothing in a planing action said flattened face formed by said chipping means as said head member rotates progressively removing material from the workpiece;

said planing means having a planing edge substantially parallel to said workpiece-confronting face;

said planing means including a planing bit removably-mounted within a socket in said workpiece-confronting face and having multiple planing edges, one of which at a time is spaced outwardly of and parallel to said workpiece-confronting face in a working position to produce said planing action, said bit being rotatable within said socket to present a different planing edge thereof in said working position when one said edge is dulled.

4. A rotary chipping head for a chipping edger machine for forming a smooth flat face on a wooden workpiece, the chipping head comprising:

a rotary head member having means for mounting said member for rotation about an axis, opposite end faces in planes normal to said axis, including a flat workpiece-confronting face extending normal to said axis and a radially outer periphery defining the outer limits of said faces;

chipping means at said outer periphery and next adjacent to said workpiece-confronting face having a straight chipping edge normal to said face at the radially outer limits of said outer periphery for progressively removing material from a wooden workpiece in a chisel-cutting action as said workpiece moves linearly and non-rotationally relative to said workpiece-confronting face and in the plane of said face, thereby leaving a flattened face on the workpiece;

and planing means on said workpiece-confronting face radially inwardly of said chipping edge for smoothing in a planing action said flattened face formed by said chipping means as said head member rotates progressively removing material from the workpiece;

said planing means having a planing edge substantially parallel to said workpiece-confronting face;

said planing menas including multiple planing bits arranged in side-by-side relationship with their individual planing edges in a straight line to present, in effect, a single planing edge at said workpiece confronting face.

5. A rotary chipping head for a chipping edger machine for forming a smooth flat face on a wooden workpiece, the chipping head comprising:

a rotary head member having means for mounting said member for rotation about an axis, opposite end faces in planes normal to said axis, including a flat workpiece-confronting face extending normal to said axis and a radially outer periphery defining the outer limits of said faces;

chipping means at said outer periphery and next adjacent to said workpiece-confronting face having a straight chipping edge normal to said face at the radially outer limits of said outer periphery for progressively removing material from a wooden workpiece in a chisel-cutting action as said workpiece moves linearly and non-rotationally relative to said workpiece-confronting face and in the plane of said face, thereby leaving a flattened face on the workpiece;

and planing means on said workpiece-confronting face radially inwardly of said chipping edge for smoothing in a planing action said flattened face formed by said chipping means as said head member rotates progressively removing material from the workpiece;

said planing means having a planing edge substantially parallel to said workpiece-confronting face;

said planing means comprising a planing bit positioned near said outer periphery, the planing bit having a planing edge extending along said workpiece-confronting face at a positive angle with respect to a radius of said head member extending through said edge in the plane of said face.

6. A rotary chipping head according to claim 5 wherein said planing edge extends inwardly of said outer periphery a distance that is substantially less than the radius of said head and said positive angle is approximately 8°.

7. A rotary chipping head for a chipping edger machine for forming a smooth flat face on a wooden workpiece, the chipping head comprising:

a rotary head member having means for mounting said member for rotation about an axis, opposite end faces in planes normal to said axis, including a flat workpiece-confronting face extending normal to said axis and a radially outer periphery defining the outer limits of said faces;

chipping means at said outer periphery and next adjacent to said workpiece-confronting face having a straight chipping edge normal to said face at the radially outer limits of said outer periphery for progressively removing material from a wooden workpiece in a chisel-cutting action as said workpiece moves linearly and non-rotationally relative to said workpiece-confronting face and in the plane of said face, thereby leaving a flattened face on the workpiece;

planing means on said workpiece-confronting face radially inwardly of said chipping edge for smoothing in a planing action said flattened face formed by said chipping means as said head member rotates progressively removing material from the workpiece; and a channel on said workpiece-confronting face forwardly adjacent to said planing means and extending generally radially to an intersection with the outer periphery of said head;

said planing means having a planing edge substantially parallel to said workpiece-confronting face.

8. A rotary chipping head for a chipping edger for removing a thickness of material as pulp chips from a log or other cylindrical wooden workpiece to form a smooth flat face of the workpiece, the chipping head comprising:

a rotary head member having means for mounting said member for rotation about an axis, a flat end face extending normal to said axis to define a workpiece-confronting face, and an outer periphery defining the outer radial limits of said face;

chipping means adjacent said workpiece-confronting face having a straight chisel-type chipping edge extending normal to said face at the outermost radial limit of said outer periphery for progressively chipping material from a wooden workpiece in a plane normal to said face as the workpiece moves linearly and non-rotationally toward said chipping head in the plane of said workpiece-confronting face to remove a thickness of material from a side portion of said workpiece, leaving a flattened face on the workpiece; and planing means on said workpiece-confronting face near said outer periphery but radially inward of said chipping edge for smoothing said flattened face as said chipping head rotates;

the planing means including a planing bit removably mounted within a socket in the workpiece-confronting face and an approximately radial channel in the workpiece-confronting face forwardly adjacent the planing bit for conducting planar shavings to the outer periphery of the chipper head;

the planing bit having multiple straight planing edges, one of said edges protruding from said workpiece-confronting face and extending parallel thereto in a working position near said outer periphery at a positive angle to a radius of said cutter head to produce said planing action; the others of said edges being contained within the socket; the planing bit being rotatable within the socket to present a different planing edge thereof in said working position when said one edge is dulled.

9. A rotary chipping head according to claim 8 wherein said planing means includes at least two planing bits arranged in side-by-side relationship with their individual planing edges in said working position aligned to present, in effect, a single planing edge on said workpiece-confronting face;

each of said planing bits having four planing edges defining a square;

a cross-section of each planing bit normal to said planing edges defining a trapezoid having two parallel broad square faces, the larger of which terminates at said planing edges and extends into said socket at a small positive angle to a plane normal to said workpiece-confronting face.

* * * * *